United States Patent [19]

Chisholm

[11] Patent Number: 5,179,701

[45] Date of Patent: Jan. 12, 1993

[54] ORGANIZING A PROCESS DATABASE HAVING DIFFERENT TYPES OF DATA BLOCKS BY MAINTAINING SEPARATE TABLES FOR GENERIC ROUTINES AND FOR BLOCK-TYPE SPECIFIC ROUTINES

[75] Inventor: Alpin C. Chisholm, Plainville, Mass.

[73] Assignee: Intellution, Incorporation, Norwood, Mass.

[21] Appl. No.: 366,740

[22] Filed: Jun. 15, 1989

[51] Int. Cl.⁵ .............................................. G06F 1/40
[52] U.S. Cl. ............................ 395/600; 364/DIG. 1; 364/280; 364/282.1; 364/282.2
[58] Field of Search ... 364/200 MS File, 900 MS File; 395/600, 650, 700

[56] References Cited

U.S. PATENT DOCUMENTS

| | | | |
|---|---|---|---|
| 4,718,025 | 1/1988 | Minor et al. | 364/550 |
| 4,809,170 | 2/1989 | Leblang et al. | 364/200 |
| 4,885,684 | 12/1989 | Austin et al. | 364/200 |
| 4,905,138 | 2/1990 | Bourne | 364/200 |
| 4,961,133 | 10/1990 | Talati et al. | 364/200 |

FOREIGN PATENT DOCUMENTS 0304071  8/1988  European Pat. Off.

OTHER PUBLICATIONS

Expert Database Systems Proc. from the first Int. Workshop, 1986, R. King, "A Database Management System Based on an Object-Oriented Model" pp. 443-468.

Angelwandte Informatik, Applied Informatics, vol. 30, No. 3, Mar. 1988, Braunschweig DE, H.-G. Brinkmann et al., "Ein Modell zur Spezifikation von Fordertechnischen Steuerungsmoduln" pp. 116-124.

Primary Examiner—Kevin A. Kriess
Attorney, Agent, or Firm—Fish & Richardson

[57] ABSTRACT

A system that comprises a process database of the kind that includes a plurality of types of data blocks, each block type using categories of routines for processing data in blocks of that type, including a category of routines that are specific to the block type and a category of routines that are generic to at least two of the block types; the system includes a table that contains a record of information concerning the category of routines that are specific to an individual block type, and a separate table that contains a record of information about the generic category of routines. This arrangement allows new types of data blocks to be added or existing block types modified (e.g., by changing routines or adding new routines) simply by creating or changing the table for that block type, without having to change the separate table for the generic routines.

25 Claims, 8 Drawing Sheets

Record 54a for Specific Header for Block Type 30a

| Name of block type | 60 |
| Total number of data blocks | 62 |
| Number of data blocks used | 64 |
| Sizes of data blocks | 66 |
| Versions of data blocks | 68 |
| Attributes of data blocks | 70 |
| Pointer to 1st data block of this type | 72 |

FIG. 6

Generic Header Record 52

| File Name | 56 |
| File Size | 58 |

FIG. 5

Process Database Record 50

| Generic Header | 52 |
| Specific Header for Block Type 30a | 54a |
| Specific Header for Block Type 30b | 54b |
| Specific Header for Block Type 30n | 54n |
| Block 22 | |
| Block 22 | |
| Block 22 | |
| Block 22 | |

FIG. 4

| Name of Field | Location of Field | Size of Field | Input Function | Output Function | Protection Level | Catch all Parameter |
|---|---|---|---|---|---|---|
| | 98 | 100 | 102 | 104 | 106 | 108 |
| CHDR | | | | | | |
| CHECK | | | | | | |
| DBNAM | | | | | | |
| DRPDB | | | | | | |
| FIND | | | | | | |
| KEY | | | | | | |
| LOCK | | | | | | |
| PREV | | | | | | |
| SACOU | | | | | | |
| SACOV | | | | | | |
| SACPR | | | | | | |
| SACST | | | | | | |
| START | | | | | | |
| UNLOC | | | | | | |

System FDT 34

Header Field Descriptor Table 36

| Name of Field (130) | Location of Field (132) | Size of Field (134) | Input Function (136) | Output Function (138) | Protection Level (140) | Catch all Parameter (142) |
|---|---|---|---|---|---|---|
| BSW — Block Status Word Routines 144 | | | | | | |
| Routines re alarm Procedure 146 | | | | | | |
| Misc. Routines 148 | | | | | | |
| Scan Routines 150 | | | | | | |

FIG. 10

Block Specific Field Descriptor Tables 32a–32n

| Fields in the Block | Name of Field (160) | Location of Field (162) | Size of Field (164) | Input Function (166) | Output Function (168) | Protection Level (170) | Catch-all Paramenter (172) |
|---|---|---|---|---|---|---|---|
| Required routines (174) | BLOCK | | | | | | |
| Generic routines (176) | | | | | | | |
| Other routines (178) | | | | | | | |

ORGANIZING A PROCESS DATABASE HAVING DIFFERENT TYPES OF DATA BLOCKS BY MAINTAINING SEPARATE TABLES FOR GENERIC ROUTINES AND FOR BLOCK-TYPE SPECIFIC ROUTINES

This application includes a microfiche appendix (3 microfiche, 216 frames) of the source code appendix discussed in the specification.

BACKGROUND OF THE INVENTION

This invention relates to process databases that are updated and accessed in real time.

Such database may be used, for example, in a computer system for monitoring and controlling operation and conditions in a manufacturing environment. It is known to organize a process database into categories or "blocks" according to the types of data that are stored in the database and processed by the computer. For example, input data (such as information from sensors that monitor operating conditions, e.g., temperature) are stored in input data blocks, and output data blocks contain data that is to be sent to control devices (i.e., process hardware), for example, to manipulate a valve to control temperature.

Every block contains sufficient information to fully define all of the data that is associated with it. For example, an input block holds enough information to completely define one input point (i.e., one sensor) in the system. This input point may have a number of categories associated specifically with it, such as the identity of the sensor that generates the data (e.g., a particular temperature sensor), the type of sensor, and the manner in which the data is to be processed.

There are also generic categories of information that are common to all blocks. While the actual data for the generic categories generally is different for different blocks, each block contains information in the generic categories. Examples of these generic categories are block status, alarm priority, alarm destination, and current alarm.

Typically, every block is stored in the process database in its entirety; that is, each block is stored as a collection of the generic categories and its specific categories.

SUMMARY OF THE INVENTION

The invention features, in one general aspect, a system that includes a process database of the kind that includes a plurality of types of data blocks, each block type using categories of routines for processing data in blocks of that type, including a category of routines that are specific to the block type and a category of routines that are generic to at least two of the block types; a table contains a record of information concerning the category of routines that are specific to an individual block type, and a separate table contains a record of information concerning the generic category of routines.

As a result, information about generic routines is described only once, rather than being duplicated for each block type, thereby significantly reducing the memory space needed to store the tables and the time needed to access the individual block types.

Preferred embodiments include the following features.

A plurality of tables corresponding to the plurality of block types, each table containing a record of information concerning the category of routines that are specific to the corresponding block type, and the record of the separate table contains information concerning the generic category of routines for plurality of block types. A second separate table includes a record of information concerning a category of routines that are generic to the system, and the records of plurality of tables, the separate table, and the second separate table each comprise a set of entries that indicate parameters of each routine.

Preferably, one of parameters is a name of a described routine, another is a location in a memory of a piece of data that the described routine will process, and still another parameter is the size of that piece of data. Additional parameters include an input function for processing data that the described routine will process, an output function for processing data that the described routine will process, and the protection level of data for the described routine. Yet another parameter is generic and can be different for different described routines.

The data blocks comprise header fields and other fields; the generic routines process data in the header fields, and the specific routines process data in the other fields of the block.

In one embodiment, the tables are located in a plurality of computers that communicate over a network and contents of the table and the separate table are identical for at least some of the computers. One or more computers transfer data between its process database and external devices, (such as a sensor that sends data representative of a detected condition to the process database, or a control device for performing an operation in response to data sent from the process database). At least one of the computers obtains over the network data stored in the process database of the computers that transfer data to and from the external devices.

At least one routine in the category that is specific to one of the block type is also in the category that is specific to another block type.

A second aspect of the invention features a method of adding a new type of data block that will use the category of generic routines, comprising defining a category of routines that are specific to the new type of data block, and creating a table for the new block type that contains a record of information concerning this category of specific routines; information concerning the category of generic routines is in a record of a separate, pre-existing table so that the generic routines need not be reentered in the table that is created for the new block type.

In a third aspect of the invention, an existing type of data block that uses the category of generic routines is modified by modifying one or more routines that are in the category that is specific to the type of data block, and modifying a table for that block type that contains a record of information concerning the category of routines to describe the modified routines; information about the category of generic routines is in a record of a separate table so that the generic routines need not be reentered when modifying the table for the modified block type.

Preferred embodiments include the following features.

An existing block type is modified to change an existing routine in the category of specific routines for that block by changing the selected routine and changing the record that contains information about said changed routine in the table for that block type, without changing a record in the separate table for the generic routines. An existing block type is modified to add a new routine by adding the new routine to the category of specific routines for that block type, and changing the table for that block type to include a record that contains information about the new routine, without changing a record in the separate table for the generic routines.

Because the generic categories need not be entered and described anew during the creation of the new block type or modification of a block type, the time required to formulate or modify the block type and the risk of error is greatly reduced. Further, if errors are introduced in adding or modifying the block type, the errors are confined to that block type and do not affect other block types.

The invention provides a simple, open-ended architecture for organizing the block types that requires less memory space, is rapidly accessible, and is relatively easy to augment or modify to meet the requirements of many different applications.

Other features and advantages of the invention will become apparent from the following detailed description of the preferred embodiment, and from the claims.

DESCRIPTION OF THE PREFERRED EMBODIMENT

We first briefly describe the drawings.

STRUCTURE AND OPERATION

Figure 1:
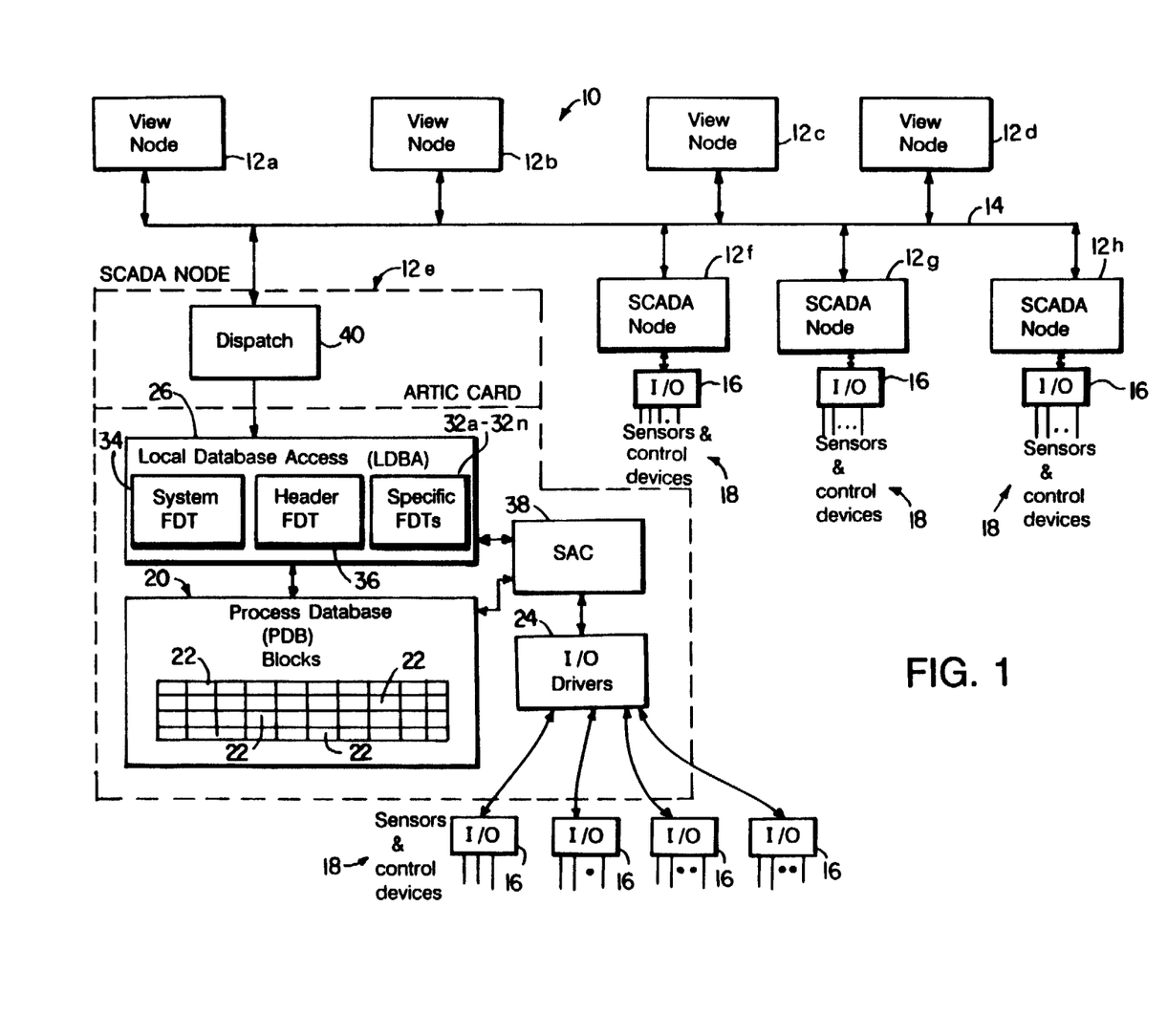
FIG. 1 is a block diagram of an automated process control system.

Referring to FIG. 1, automated process control system 10 for monitoring and controlling the operation of, e.g., a manufacturing facility, includes computers 2a-12h that are arranged as nodes to communicate over a network 14. Computers 12a-12h are, for example, IBM PS/2 computers. Some nodes, e.g., computers 12a-12d (called view nodes), are used to access data that has been gathered from machines in the factory and stored at the remaining nodes, e.g., computers 12e-12h (called supervisory control and data acquisition, or SCADA, nodes).

Each SCADA node 12e-12h acquires data from or applies data to a plurality of (such as four) I/O devices 16, providing interfaces with various commercially available sensors and control devices that are arranged at various locations throughout the factory. The sensors detect and measure many different kinds of operating parameters, such as temperature, pressure, flow rate, and fluid level, while the control devices perform various tasks, such as operating valves, actuating relays, and operating fluid pumps.

Data associated with the sensors and control devices are stored in a process database (PDB) 20, which is organized into a plurality of blocks 22, one for every sensor and control device that is coupled to that SCADA node (e.g., node 12e). Each block 22 contains information that fully describes the sensor or control device with which it is associated, and this information is arranged into one or more categories or fields. Data is transferred to and from an individual block 22 via one I/O device 16 and I/O drivers 24.

Figure 2:
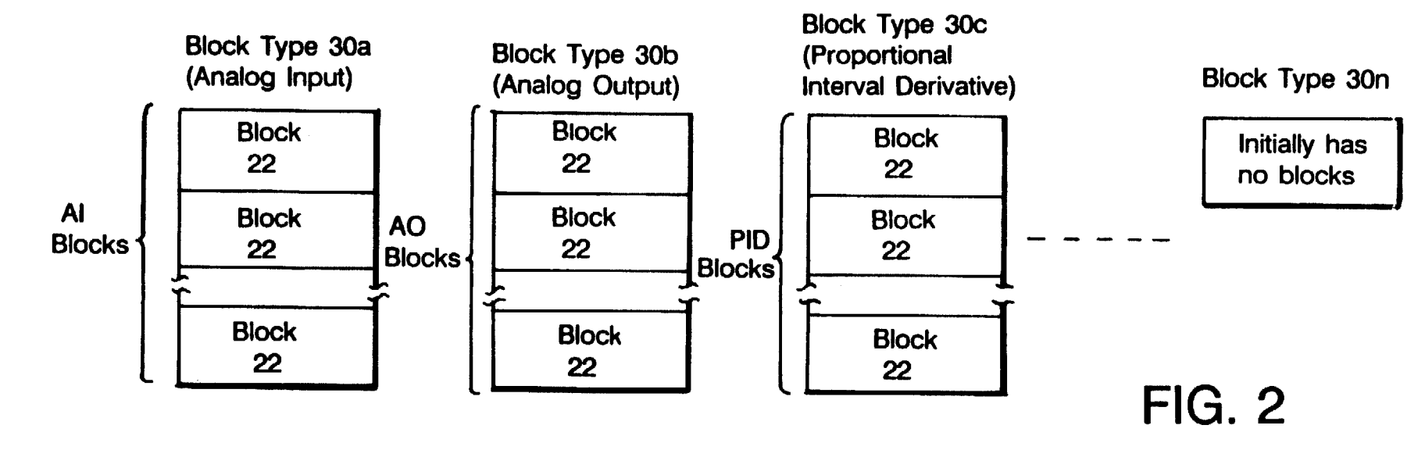
FIG. 2 illustrates the arrangement of different data block types.

Referring also to FIG. 2, data blocks 22 are organized into N types 30a-30n. System 10 can support 40 types of data blocks (i.e., N=40), but there can be many more than 40 (e.g., 1000) data blocks in each block type. Some types of blocks correspond to the function of the sensor or control device with which the data blocks 22 of that type are associated. For example, some sensors provide analog inputs to PDB 20. Blocks associated with these sensors are grouped into an "analog input" (AI) block type 30a. Blocks associated with analog output control devices are grouped into an "analog output" (AO) block type 30b.

Other blocks are associated with operations on data instead of input or output functions. For example, one type of block is used to perform a so-called proportional integral derivative (PID) operation. These blocks are grouped into PID block type 30c.

Other examples of block types (not shown) that are correlated with function are CALCULATE (to perform any generic calculation), PROGRAM (to perform a decision step according to a data value), LEAD-LAG (to control feed forward operations for, e.g., heat exchangers), DEAD-TIME (which allows time taken for, e.g., fluid to flow entirely through a pipe to be taken into account in processing the data), and STATISTICAL (to assist in quality control by generating statistical information from a set of data).

System 10 uses less than all, such as 24, of the 40 block types. The twenty four block types are as follows:

| | |
|---|---|
| ANALOG INPUT- | Reads an analog value from the I/O device and alarms on it. |
| ANALOG OUTPUT- | Sends an analog value to an I/O device. |
| ANALOG REGISTER- | Reads/sends an analog value to/from an I/O device. |
| ON-OFF BLOCK- | Based on the value of the previous block, this block will turn a two set of digital points ON or OFF. |
| BOOLEAN BLOCK- | Performs boolean arithmetic on up to 8 different inputs. |
| CALCULATION BLOCK- | Performs arithmetic computations on up to 8 different inputs. |
| DEVICE CONTROL- | Reads 16 digital values and/or sends 8 digital values to the I/O device. Also capable of simulating a simple programming language. |
| DIGITAL INPUT- | Reads a digital value from an I/O device and does alarming. |
| DIGITAL OUTPUT- | Sends a digital value to an I/O device. |
| DIGITAL REGISTER- | Reads/sends a digital value to/from an I/O device. |
| DEAD TIME- | Delays a value coming into the block for a specified time interval. |
| EVENT ACTION- | Based on the value and/or the alarm state of the previous block, STOP/RUN a block, OPEN/CLOSE a digital point. |
| FANOUT- | Copies the previous block's value to up to 4 target blocks. |

| | |
|---|---|
| HISTOGRAM- | Uses the previous block's value to build a histogram according to specified conditions. |
| LEAD-LAG- | Used to perform feedforward control. |
| PID- | Used to perform feedback control. |
| PROGRAM- | Allows the operator to use simple English-like commands to perform simple operations like sending outputs, etc. |
| RATIO-BIAS- | Can be used to perform ratio control. |
| RAMP- | Used to ramp a value to a specified target. |
| STATISTICAL CONTROL- | Performs statistical control to allow tighter operating conditions. |
| STATISTICAL DATA- | Does statistical analysis on sets of data to enable the operator to identify problem in the plant. |
| SIGNAL SELECT- | Can be used to perform selective control to enable multiple PID blocks to operate one control valve. |
| TREND- | Allows the user to perform real/time trending of data. |
| TOTALIZER- | Maintains a running total of realtime data. |

The block types are described in block-type specific field descriptor tables (FDTs) 32a-32n in a local database access (LDBA) 26 in the SCADA node (FIG. 1) to allow new block types to be added or the characteristics of existing block types to be modified as desired.

Each block-type specific field descriptor table 32a-32n in LDBA 26 describes all of the fields of all of the blocks of that type everywhere in system 10. LDBA 26 also contains a system FDT 34 and a header FDT 36, each of which is described in detail below.

Data is passed between PDB 20 and sensors and control devices 18 via I/O devices 16, I/O drivers 24, and scan alarm and control (SAC) 38, which is a software module for processing the data in blocks 22. Some data (such as analog input data) may be passed directly between SAC 38 and the corresponding AI blocks 22, but other data (e.g., data to be used with a PID block 22) must be transferred via block-type specific FDTs 32a-32n in LDBA 26.

PDB 20, LDBA 26, I/O drivers 24 and SAC 38 are all software modules stored at the SCADA node, either in working memory or in memory of a so-called ARTIC (i.e., a real time interface coprocessor) card (available from IBM) that is plugged into the backplane of the PS/2 computer. Either the ARTIC card or the CPU and memory of the computer itself may be used. The ARTIC card has the advantage of increased memory space (about 1 megabyte of working memory) over the working memory of the remainder of the PS/2 (approximately 640 Kbytes). However, the ARTIC card runs more slowly than the main CPU. Also, the ARTIC card allows the SCADA node to use up to four I/O devices 16; only two I/O devices 16 can be used if the main CPU and working memory are utilized instead.

In operation, users run one of a number of possible applications at viewer computers 12a-12d, such as a "viewer" application in which the data gathered by one or more I/O devices 16a-16n throughout the factory is obtained and displayed at the viewer computer. Another application is historical trending, in which values of data from one or more of the sensors and control devices 18 (or from one or more blocks 22) are stored to files for later use.

All of the blocks 22 in every SCADA node 12e-12h are identified by unique names called "tags". An application executing at any viewer node 12a-12d obtains data from any SCADA node 12e-12h by placing a request on network 14 that identifies the node (i.e., the SCADA computer that contains the block of interest), the tag that corresponds to the block, and the field or category of the block (such as the current temperature from the corresponding sensor or the temperature alarm limit).

This request is processed by a dispatcher 40 in each SCADA node 12e-12h, which determines if it is the node identified by the request. If so, the request is applied to LDBA 26, and the requested block/field ar obtained and sent to the requesting node 12a-12d over network 14.

Figure 3:
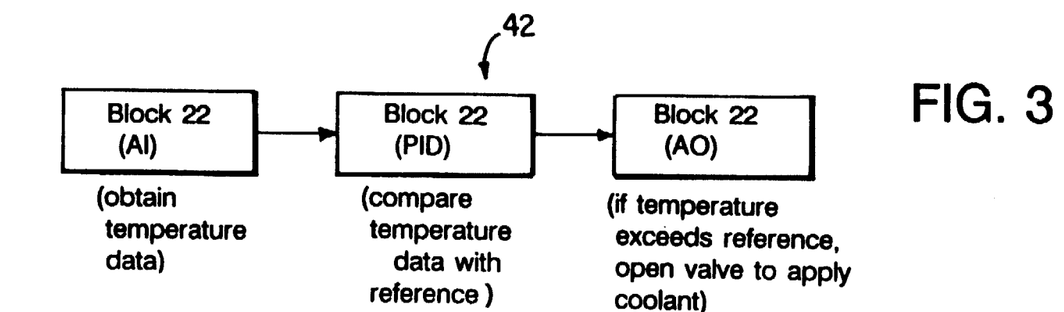
FIG. 3 shows a chain of data blocks.

Referring also to FIG. 3, SAC 38 periodically (e.g., once each second) performs a "scan" of data blocks 22 stored in PDB 20 to either obtain data from a sensor 18 and store it at a corresponding block 22 or send values stored in blocks 22 to corresponding sensors or control devices 18. In each scan, SAC 38 sequentially processes a plurality of blocks called a chain 42.

For example, a field (such as the present temperature of a machine in the factory) may be obtained from an AI block, then a PID operation associated with a field of a PID block (such as comparing the present temperature with a reference) is performed, and if the temperature exceeds the reference, an AO block 20 is used to, e.g., open a valve to apply coolant to the machine until the temperature is again within limits.

Generally, the existing types of blocks provide the types of I/O interfaces (i.e., AI, AO, etc.) and the range of functionality (i.e., PID, CALCULATION, etc.) necessary to perform applications desired by the user. However, some applications may require functionality that is not available through the existing block types, or may require an existing block type to operate in a different way. PDB 20 is table driven by the FDT tables 32a-32n, 34, 36, in LDBA 26 to facilitate adding new data block types, adding new blocks of an existing type, and modifying (by changing an existing field or adding a field) existing data block types.

An example of a new block type that can be added is one that performs the combined functions of an AI block type 30a, a PID block type 30c, and an AO block type 30b (FIG. 2). An existing block can be modified in a wide variety of ways. For example, a RAMP block type causes SAC 38 to ramp a value (such as a setpoint for a sensor 18) between initial and final values. The block type is set up to obtain a ramping time interval from the operator. It is possible to modify the RAMP block type to respond instead to the entry of a ramp rate.

A field is added to an existing block type to allow a new function to be performed on its data. For example, a TREND block type allows a current value (e.g., temperature) to be processed to show a temperature trend. A field may be added to this block type to, e.g., allow trending of any value.

Figure 4:
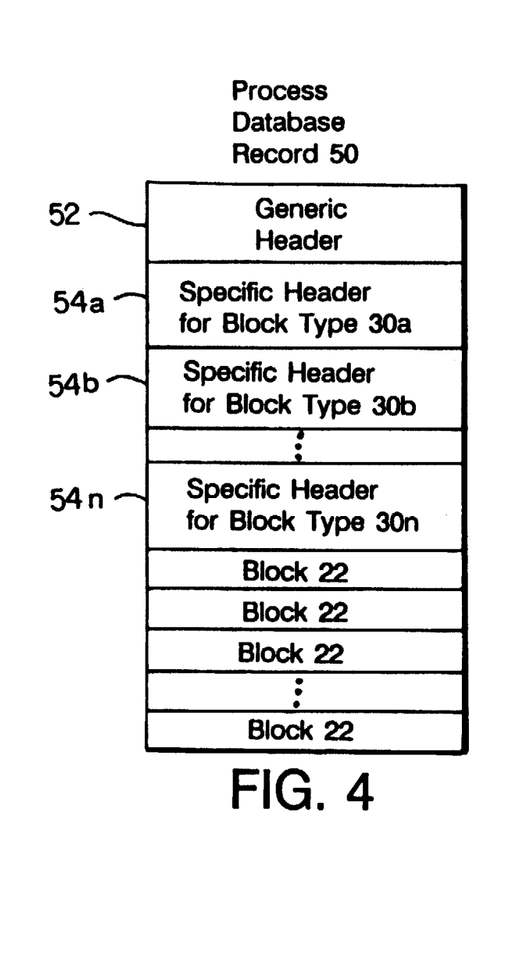
FIGS. 4-6 illustrate data records.
Figure 5:
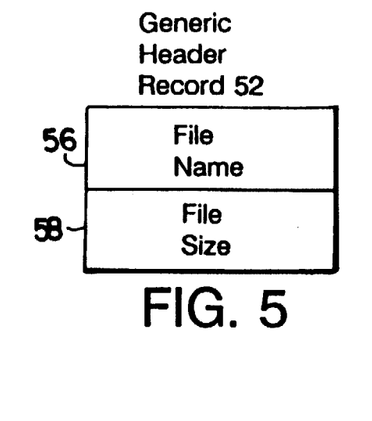
Figure 6:
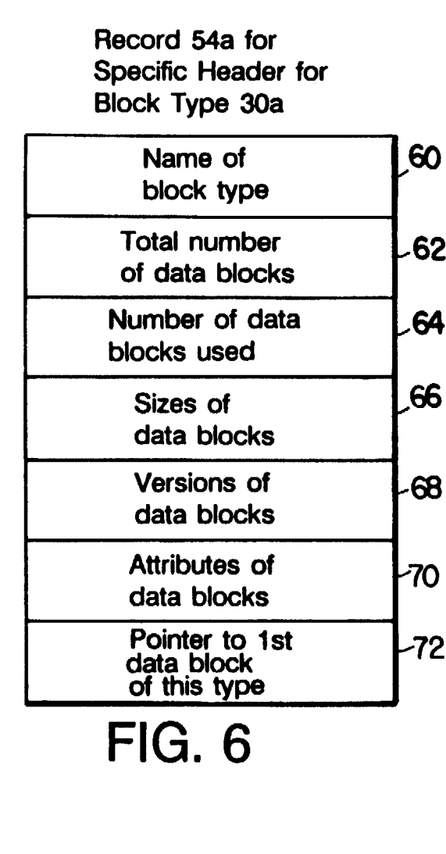

Referring to FIGS. 4-6, PDB 20 is organized into a record 50 that includes a generic header 52, a set of specific headers 54a-54n (one for each data block type 30a-30n) and all of the data blocks 22. Generic header 52 (FIG. 5) is a record that identifies the name 56 of the file that contains data blocks 22 and the size 58 of this file.

Each specific header is associated with a single data block type 30a-30n and includes a record that identifies the existing data blocks of that type. For example, record 54a (FIG. 6) corresponds to analog input (AI) block type 30a and contains a set of records 60-72 that describe the AI block type. Record 60 holds the name of the data block type (e.g., AI). The number of data blocks that have been allocated for type AI (e.g., 100) are identified in record 62, while the number of blocks that are currently used is designated by record 64. The number in record 64 cannot exceed that in record 62.

Because there are forty allowed block types, record 50 contains forty specific headers 54a-54n. If a block type exists but is not used (i.e., there are currently no data blocks 22 in that type) record 64 is zero; record 64 contains the value −1 if the block type does not exist.

Record 66 designates the size of each AI block. This information is used as an offset to enable any AI block to be rapidly accessed, as discussed below. The present version of the each AI block is identified by record 68. Record 70 designates whether the block type is a primary block (meaning that blocks of that type can be used to start a chain—FIG. 3) or a secondary block (which means that its blocks can only be used within an existing chain). The AI block type is primary.

A pointer to the first of the AI data blocks is held in record 72. This pointer is used in conjunction with the size information in record 66 to enable any AI block to be quickly accessed.

Referring to FIG. 1, each node 12a-12h stores a set of routines that are generic to every node 12a-12h. To obviate the need to store this system information with each block 22, the system generic routines are described in system field descriptor table (FDT) 34 in LDBA 26. This provides a single record that describes all of the system generic routines.

Figure 7:
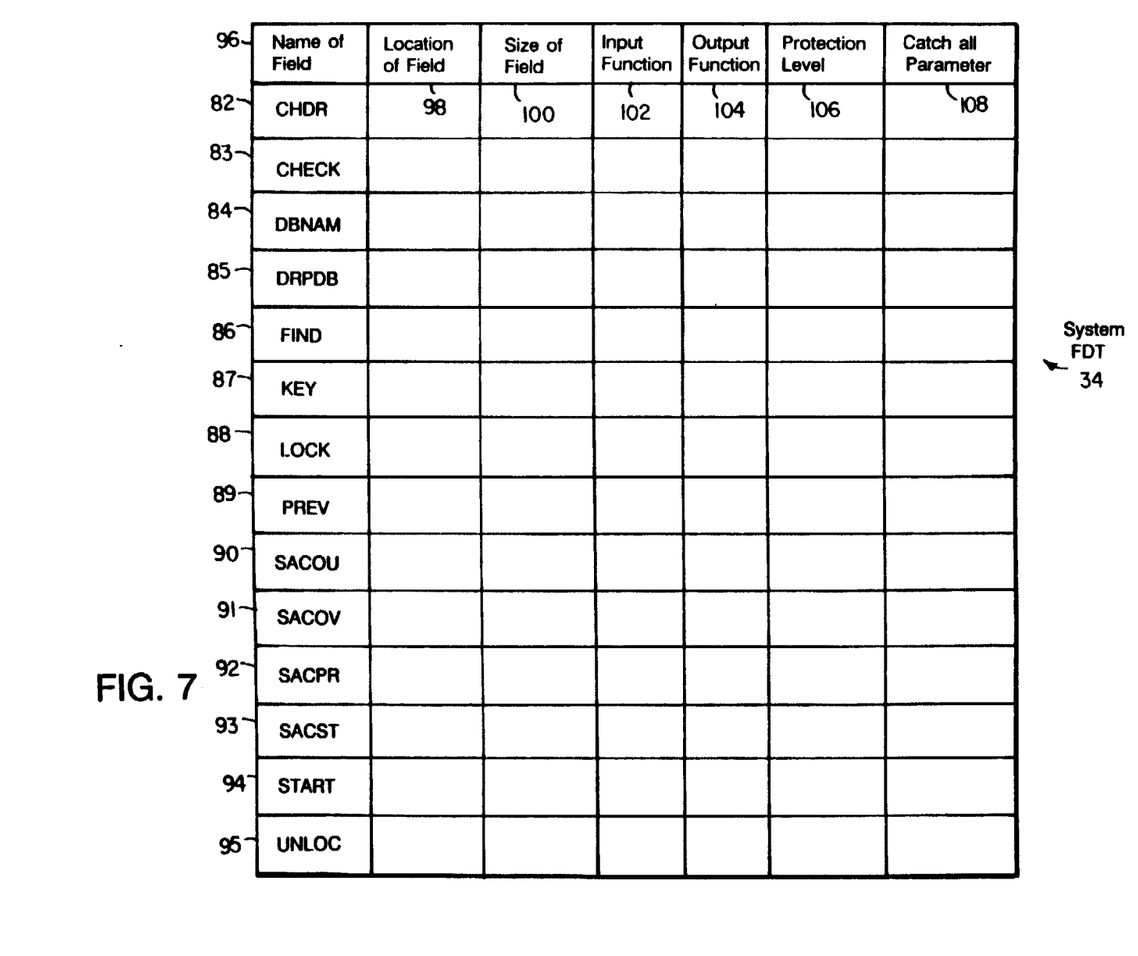
FIG. 7 shows the system field descriptor table for the system of FIG. 1.

Referring to FIG. 7, there are fourteen system generic routines 82-95:

| | |
|---|---|
| CDHDR (82)- | return the specific headers for all block types (FIG. 6). |
| CHECK (83)- | check the integrity of the PDB for any errors that are generated when block types are added or modified. |
| DBNAM (84)- | return the location and name of PDB 20 (i.e., file name 56-FIG. 5). |
| DRPDB (85)- | return (i.e., display) the name, date, and size of all databases on the current SCADA node. |
| FIND (86)- | find a block 22 in an identified block type 30a-30n that can be allocated (using fields 62, 64- FIG. 6). |
| KEY (87)- | perform KEY checking (i.e., to determine what applications an identified node can run). |
| LOCK (88)- | set a lock bit in the block status word (BSW) of an identified block to inform other applications not to access that block. |
| PREV (89)- | find the tag (i.e., name) of the block that precedes the current block in a chain. |
| SACOU (90)- | obtain the system output enable/disable status (a block's output is typically disabled during a test or simulation to prevent test values from inadvertently causing control devices to operate). |
| SACOV (91)- | report the number of SAC overruns (i.e., the number of times that SAC 38 did not have finish processing within its scan interval). |
| SACPR (92)- | read/write system alarm priority (a block's alarm will be sent to the operator only if the block's alarm priority equals or exceeds the system alarm priority; system alarm priority is typically set to a low value during start-up (when many meaningless errors occur) and is increased when the machine being monitored has warmed up). |
| SACST (93)- | return SAC status (i.e., whether SAC 38 is running). |
| START (94)- | get ready to do CHECK (i.e., check the chains of data blocks 22). |
| UNLOC (95)- | clear the LOCK bit in the block status word (BSW) to allow other applications to access the block. |

Each routine 82-95 comprises an entry or field of system FDT 34. System FDT 34 (and, as discussed below, header FDT 36 and block-type specific FDTs 32a-32n) includes a record of seven entries 96-108 for each field 82-95. The name of the field is held in entry 96. The location of field entry 98 is not relevant to system FDT 36; it is included in the FDT to make all FDTs consistent, as discussed below. Entry 100 identifies the size of the field.

The functions that are executed to perform the function associated with each field 82-95 are specified in entries 102 and 104. Entry 102 contains a pointer to the start of an input routine (i.e., a routine that is performed by LDBA 26 to perform the function of the field 82-95). Entry 104 holds a pointer to the start of an output routine, that is, a process performed by LDBA 26 to perform the function associated with field 82-95. Some fields 82-95 have both input and output functions; all must have at least one of the two.

The protection level accorded a field 82-95 is specified in entry 106. The content of entry 106 thus determines whether the field 82-86 with which it is associated can be changed and, if so, what level of priority one must have to make the change. Because fields 82-95 all identify generic system routines that will not be changed often, if at all, the protection level specified in all entries 106 should be high.

Entry 108 provides space for a catch-all parameter that can be used or not as needed with each field 82-95. For example, entry 108 may contain a value from one of fields 82-95 that identifies the order of the routines whose data is to be displayed.

Figure 8:
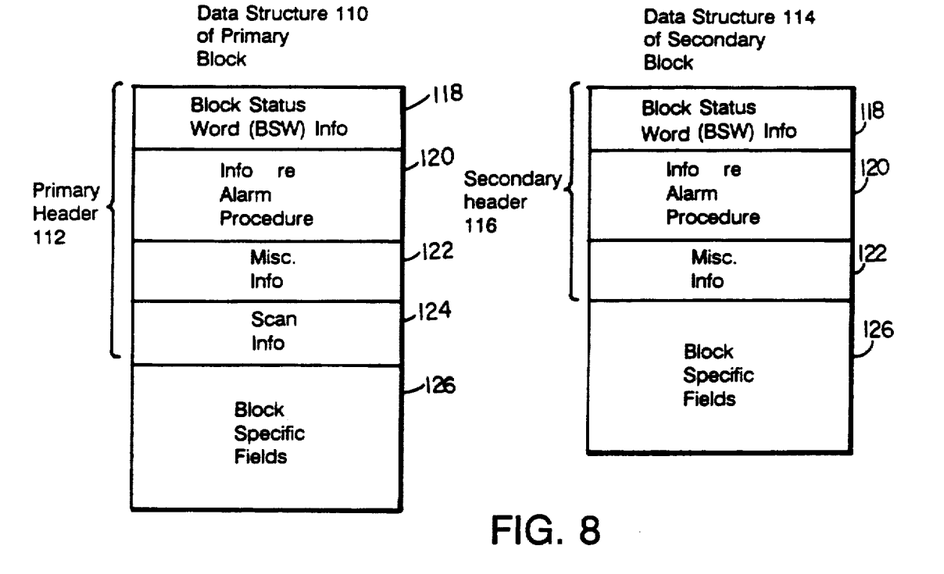
FIG. 8 is a diagram of the data structures of a primary data block and a secondary data block.

Referring to FIG. 8, the data structure 110 of every primary block (regardless of the block type 30a-30n) includes a primary header 112, and the data structure 114 of every secondary block (also regardless of block type) has a secondary header 116. Primary and secondary headers 114, 116 contain identical information, arranged in sets of fields 118, 120, 122 that identify the status of the block, its alarm information, and miscellaneous information about the block.

Primary header 112 also includes a set of fields 124 that contain data that relate to the procedures for scanning the block (e.g., how often SAC 38 is to scan the block, whether the block is scanned automatically or under operator control, the chain alarm status (i.e., the highest priority alarm in a chain), etc.). Because, as discussed, a secondary block (such as a PID block) can only be present within a chain of blocks (FIG. 3) there is no need to include scanning information fields 124 within secondary header 116.

Primary and secondary blocks all conclude with a set of block specific fields 126 that are, at least in the general case, different for every type 30a-30n of block. That is, while more than one block type may occasionally share information contained in their block specific fields 126, in general block specific fields 126 are unique to every block type.

There are over thirty routines that relate to data contained in header field sets 118, 120, 122, and 124, and thus the individual fields are not described here. Set of fields 118 contain data for use with routines for obtaining the status word of the block or sending the status word to a destination upon request. Data for routines relating to alarm procedures are identified in set of fields 120. Examples of these routines are: sending the alarm state of the block to a destination; determining whether alarm status should be automatic or manual; obtaining the local alarm status of the block; obtaining the alarm status of the chain that includes the block; obtaining the block's initial and/or present alarm enable/disable status; obtaining the latched alarm status of the block; and obtaining the new alarm status.

Data that are used in miscellaneous routines are identified by set of fields 122. Examples of these miscellaneous routines are: obtaining the initial auto/manual state of the block (i.e, the state is generally manual during testing or simulation and automatic during actual operation); GET and/or PUT the name (tag) of the next block in the chain; GET and/or PUT the block's warm start enable/disable status (when warm start is enabled, a block will begin where it left off when power has been restored after an interruption); and initialize the block status word.

Set of fields 124 contain data for use with routines that perform scanning. These scan routines include: GET and/or PUT the initial scan status of the block; GET and/or PUT a value to request that the scan status of a block be turned ON or OFF; GET and/or PUT the block's scan time (i.e., how often the block is to be scanned) and phase (i.e., at what point in the scan cycle the scan is to begin); and GET and/or PUT the block's scan counter (which indicates how much time remains before the next scan begins).

From the above discussion it is seen that primary and secondary headers 112, 116 contain data for many routines that are common (with the exception of scan routines for secondary blocks) to all blocks.

Figure 9:
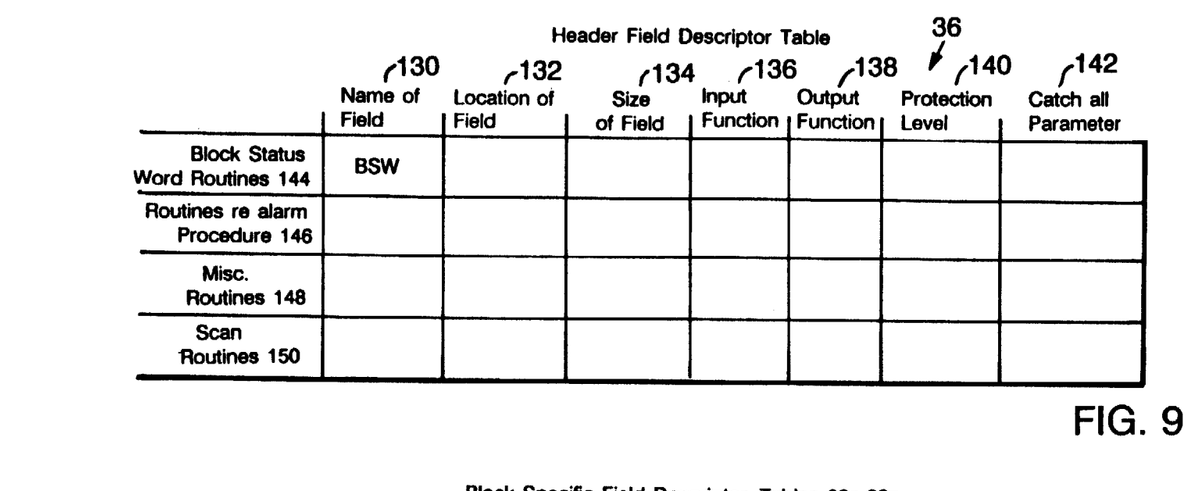
FIG. 9 is a diagram of the header field descriptor table according to the invention.

Referring to FIG. 9, the routines for the primary and secondary headers 112, 114 are organized into a header field descriptor table (FDT) 36 in LDBA 26 (FIG. 1). This eliminates having to store information about these routines in every block-type specific field descriptor table FDT 32a-32n (FDTs 32a-32n are described in detail below.)

Header FDT 36 includes a record of entries 130-142 for each primary and secondary header routine. For convenience, all block status word (BSW) routines are shown as being included in a single field 144. Likewise, all routines for alarm procedures are shown in field 146, all miscellaneous routines are in field 148, and field 150 is shown to contain all scan routines. In reality, however, header FDT includes a field (i.e., a row) for every primary and secondary header routine.

Entries 130-142 (i.e., the columns of header FDT 36) are identical in kind to the entries 96-108 of system field descriptor table 34 (FIG. 7). Thus, the entries 130-142 for an illustrative routine for getting and/or putting the block status word (BSW) of a block will be described.

Entry 120 contains the name (i.e., "BSW") of the routine, and a pointer in entry 132 designates the starting location of the BSW in the block of interest. Note that the address specified by this pointer is not absolute, but rather is an offset from the starting address of the block to the point at which the BSW begins. This addressing scheme is possible because all blocks of the same type have the same overall size and the same size fields. The size of the object of the routine (i.e., the BSW) is contained in entry 134.

Entry 136 contains a pointer to the starting location of the input function that is performed to do the GET/PUT BSW routine, e.g., "get the block status word". Likewise, a pointer in entry 138 designates the start of an output function that is performed to carry out the GET/PUT BSW routine (e.g., "put the block status word" to a particular destination).

The protection level of the GET/PUT BSW routine is identified by entry 140. Some routines (for example, the GET/PUT BSW routine) should not be changed and thus their fields in FDT 36 will have high protection levels. However, other routines, such as routines describing alarm destination may need to be changed if, e.g., system 10 is reconfigured. Thus, the corresponding routine (one of set 146) in FDT 36 will have a low protection level in its entry 140.

Entry 142 provides space for a catch-all parameter that may be unused or put to various uses, depending on the field in sets 144-150 with which it is used. For example, entry 142 may contain a pointer to a dictionary for defining the meaning of the various bits of the BSW).

Figure 10:
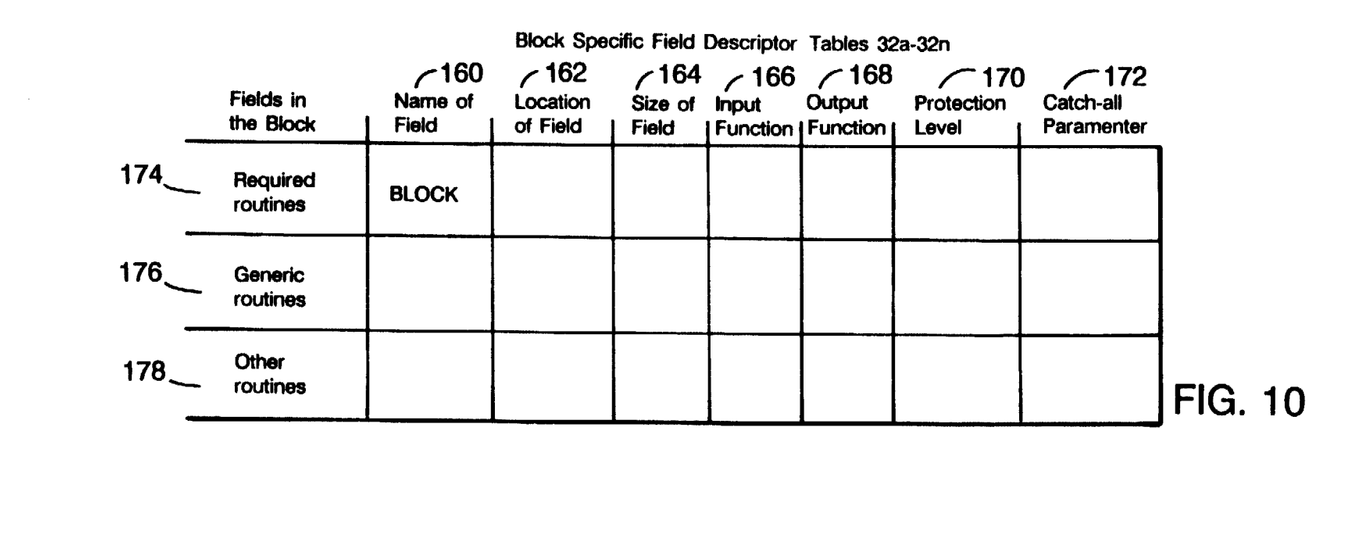
FIG. 10 illustrates one of the block-type specific field descriptor tables of the invention.

Referring to FIGS. 1, 8, and 10, the block specific fields 126 of every block 22 in each type 30a-30n of block contain data that are processed using a set of routines that are described below. The routines used to process the data in all of the blocks 22 of a given type ar identical; the only variable is the data contained in the individual blocks 22. Thus, block-type specific field descriptor tables 32a-32n describe the set of routines that are associated with block types 30a-30n, respectively, using the same table-driven format as that discussed above for system FDT 34 and header FDT 36.

Every block-type specific FDT contains a record of entries 160-172 for every routine for which blocks of the corresponding block type contain data. Entries 160-172 are the same in kind as entries 96-108 (FIG. 7) of system FDT 34 and entries 120-142 of header FDT 36. Thus, entries 160-172 will be discussed using an illustrative one of the routines described below.

Every block has a set of required routines 174. Fields for these required routines must be defined in every block-type specific FDT 32a-32n (that is, every FDT 32a-32n must include a row for each required routine). The required routines are:

| | |
|---|---|
| NAME- | a routine for naming the block. |
| ATTR- | a routine for defining the attribute of the block type, i.e., whether the block type is a primary or secondary block type. |
| BLOCK- | a routine for obtaining the entire block from PDB 20 (e.g., for modification) and putting it back in PDB 20 afterwards. |
| CHECK- | a routine (of the type defined by the FDT), which is performed when a block is added or modified. |

| | -continued |
|---|---|
| INIT- | a routine for initializing block fields with default values. |
| SIZE- | a routine for obtaining the size of the block (in bytes). |
| VERS- | a routine for obtaining the version number of the block type data structure. |

There are also a set 176 of generic field names that correspond to generic routines which need not be used but are available. If used with a given block type (e.g., AI type 30a), a generic routine must be defined by the corresponding field in the corresponding block-type specific FDT (e.g., FDT 32a). The names of the generic fields have a special meaning in system 10. Thus, if one or more generic fields 176 are not used, the names of the unused fields may not be used to designate a custom field and routine that are added to the block type (i.e., as one of other routines 178). The generic fields and their routines are:

| | |
|---|---|
| DESC- | GET/PUT the block descriptor (i.e., the name that the user associates with a given tag). |
| ELO- | GET/PUT the low EGU (engineering units) value in the input engineering units structure (e.g., to identify the lowest value that a sensor is allowed to read). |
| EHI- | GET/PUT the EGU span value (i.e., the range between the low EGU value and the highest value allowed in the input engineering units structure). |
| ETAG- | GET/PUT the EGU tag (i.e., degrees, inches, etc.). |
| EGU- | GET/PUT the input engineering units structure (which includes ELO, EHI, and ETAG). |
| OEGU- | GET/PUT the output engineering units structure. If the output EGU is no different from the input EGU the entries 166, 168 in the FDT point to the input EGU functions. |
| CV- | GET/PUT the "current output" value of the block, which can be formatted as ASCII floating point value, a bit value, a scaled integer, or a floating point value. |
| PUTn- | a GET/FROM structure that is used to put data in a field of another block. There may be several PUT routines in a block type; they are sequentially numbered using the "n" value. |
| GETn- | a GET/FROM structure that is used to get data from a field of another block. There may be several GET routines in a block type; they are sequentially numbered using the "n" value. |
| TVn- | GET/PUT the "target value" of the block. There can be several target values, which are sequentially numbered using "n"; the target value can be formatted ASCII float, floating point, scaled integer, or bit value. |
| TIME- | GET/PUT the time constant of the block (i.e., the deadtime associated with the block); this can also be formatted as discussed above. |
| DATA- | GET/PUT a block of data from or to another data block, e.g., to allow trend data to be accumulated. |

Taking the BLOCK routine described above as an example, entry 160 includes a name (i.e., "BLOCK") which identifies which input and/or output functions need to be called to perform the BLOCK routine. A pointer in entry 162 identifies the starting location in memory at which the data structure of the block on which the BLOCK routine operates. Entry 164 denotes the size of the data block being moved (i.e., GET or PUT) by the BLOCK routine. The size is identical for all blocks of the same type 30a-30n.

Entry 166 and entry 168 hold pointers to the locations in memory of the input routine and output routine, respectively, that perform the functions of getting the data block and putting the data block back in PDB 20.

The protection level assigned to the BLOCK routine is designated in entry 170. Entry 172 allows an additional "catch-all" parameter to be specified, if desired, for an individual field. While this entry does not apply for the BLOCK routine, it is quite useful for other routines. For example, entries 172 for the PUTn routines hold the "n" values. This is necessary because entries 164, 166 of all PUTn routines point to the same input and output functions; having the "n" values in entries 172 allows the identity of the PUTn routine to be determined.

One or more routines 178 are added to an existing block by creating a new field (i.e., row) in the block-specific FDT for that block. Also, an existing routine of a block type is modified (such as to perform in a different way) by changing e.g., the input and/or output function of the routine and placing a new pointer to the new functions in the appropriate entry or entries (e.g., entries 166, 168) of the corresponding field in that block type's block-specific FDT.

Figure 11A:
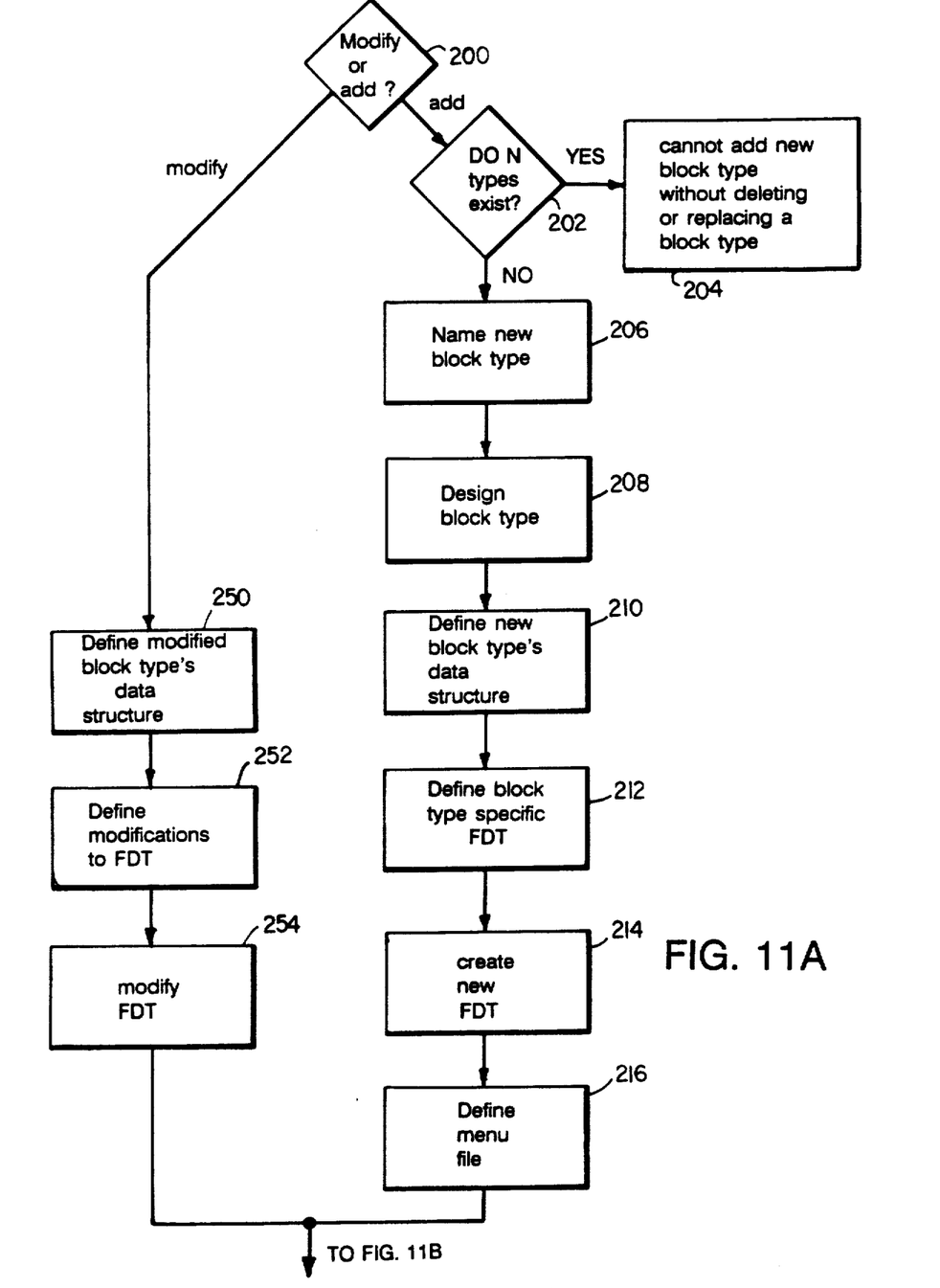
FIG. 11 is a flow diagram for adding blocks or modifying blocks according to the invention.
Figure 11B:
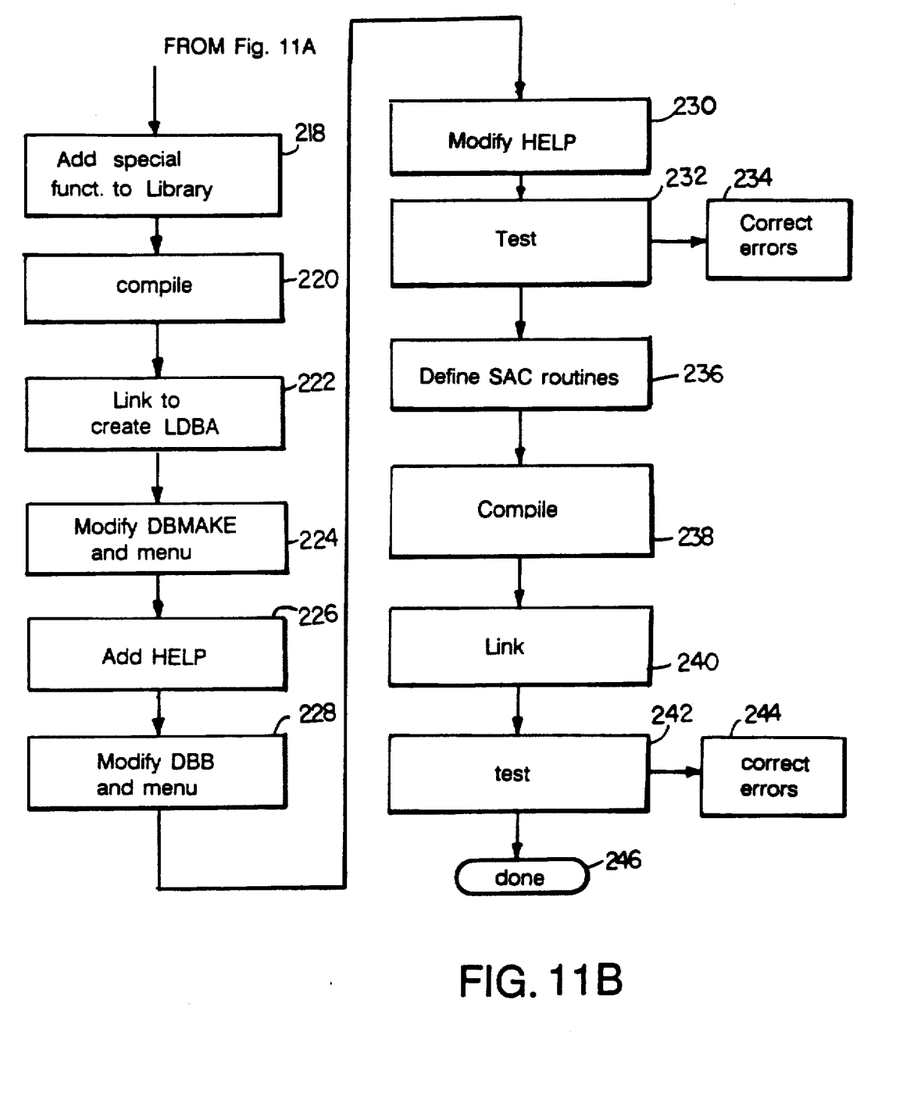

Referring to FIG. 11, the first step in adding or modifying a block type is to determine whether an existing block type is being modified or if an entirely different block type is being added (200). If a new block type is being added, it must be determined whether all forty allowed block types 30a-30n are currently in use (202). If so, a new block type cannot be added unless a current block type is deleted or replaced (204).

Assume that a new block type is to be added and that less than forty types are in use. For example, the new block type will combine the functions of the AI, PID, and AO block types. The next step is to determine a unique name (206) for the new block type (such as COM for "combined") that corresponds to its overall function. Care should be take not to assign a name that is already used for another block type.

Next, the new data block type is designed (208). The design must specify whether the new block type is a primary or secondary block. But otherwise the designer has a great deal of latitude in creating the design, that is, in specifying what the new block type is to do. Because the COM block type will perform input and output functions as well as PID, its design includes defining how the block type will handle input signals from a sensor 18, process these signals, and send output signals to a control device 18. The design will also specify how SAC 38 (FIG. 1) will process the AI and AO signals. The design step 208 also includes describing the alarm limits for the new COM block type, and the rate of change of input data that will generate an alarm.

Because the COM block includes PID functionality, the design would include specifying information about the input and output engineering units (EGUs), such as their high and low levels, range, and a tag for the input and output EGUs. Also, setpoints (i.e., TVn) will be defined as well as tuning constants such as rate of change and reset levels.

Once the new data block has been designed, its data structure is defined (210). This step includes choosing header 112 if the new block type is a primary block, or header 116 if the new block type is a secondary block. Because the COM block type will start a chain, it is created as a primary type. Designing the data structure also includes choosing data structures for, e.g., EGUs, block descriptors (i.e., the names which the user will associate with data in the new block type).

After the data structure of the new block type has been completely defined, the block-type specific FDT for the new block type is defined (212). LDBA includes forty block-type specific FDTs 32a-32n, one for each block type, even if less than forty block types have been created for system 10. Thus, all that must be done when a new block type is added is to define the sets of fields 174-178 (FIG. 10) (i.e., the rows) of the block-type specific FDT that will be used for the new block type and complete the record of entries 160-172 for each field.

Note that the required routines already exist—the corresponding fields in the new block-type specific FDT need only contain data or pointers (where appropriate) to access and use these routines.

Then, the defined block-type specific FDT is created (214), that is, the entries 160-182 in the new FDT are filled with the pointers and data that were defined in step 212 for all of the routines that the new data block type will use. Note that the header FDT 36 does not need to be accessed or changed in any way when the new block-type specific FDT is created. This is because the block-type specific FDT describes only the routines that are specific to the new block type. The generic routines that are common to all block types 30a-30n are described in header FDT table 36 and need not be redescribed each time a new block type is added.

The sizes of the block-type specific FDTs are reduced by omitting the generic information contained in header FDT 36. Also, total storage space for LDBA is decreased by storing this generic information in a single table instead of in several tables (i.e., the block-type specific FDTs).

At this point, the menu file is augmented (216) to accommodate the new data block type. This changes the menu that the operator will subsequently use (at one of nodes 12a-12h) to enter data for blocks in the new data block type.

Next, if any special dictionaries must be added (e.g., to operate with special functions or routines that are used with the new block type), the dictionaries are added to the system library (218). Then, the routines and data that have been entered in steps 200-218 are compiled (220), and the compiled software is linked (222) to the previously existing functions (e.g., LDBA library routines, etc.) to create a modified version of LDBA that includes the block-type specific FDT for the added block type. The linking step (222) also puts the modified LDBA in condition to be run by the SCADA nodes 12e-12h.

Then, an application called "DBMAKE" is modified (224) to configure PBD 20 with the number of blocks in the new block type. The programmer identifies how many blocks are allocated and used (fields 62, 64 FIG. 6) for the new block type. This informs DBMAKE that the new block type exists, and DB MAKE adds the name of the new block type, the number of blocks allocated, and the number used to a menu which is used by an operator when adding data blocks within the block type.

To allow an operator to subsequently find information about the new block type, this information is added (226) to a preexisting help file (which contains similar information about the blocks that already exist).

Next, an application called DBB that allows the block types/to be used by SAC 38 (FIG. 1) during operation of the system is modified (228) to perform this function with the new block type as well. The DBB menu is modified as well. The modified DBB displays this menu to the operator that identifies and describes all block types.

Then, the HELP application is again modified (230) to add any other information that will aid the operator in learning about or using the new block type.

LDBA 26 is then tested (232) to determine whether any errors were introduced in adding the new block type. If errors are found in the data structures, routines or the new block-type specific FDT, they are corrected (234). This procedure continues until no errors are found.

Next, a new SAC routine for running the new type of data block is defined (236) to enable SAC to use the new block type during normal operation of system (i.e., at runtime). This SAC routine is compiled (238) and linked (240) to the existing SAC library routines. The SAC library is then tested (242) and any errors that were introduced in defining the new SAC routine they are corrected (244). The block type add procedure is then complete (246).

The procedure for modifying an existing block type (e.g., changing a routine of or adding a routine to an existing block type is also shown in FIG. 11. First, the data structure of the existing block type is changed to accommodate the modification (250). This design is used as a guide in defining (252) which routine (i.e., field) in the corresponding block-type specific FDT (that is, which row of that FDT) must be changed or whether a new routine (and hence a new row in the block-type specific FDT) must be added.

Then, the block-type specific FDT is modified (254) as defined in step 252. The remaining procedure (i.e., steps 218-246) is the same as the procedure for adding a block type. Note, however, that the DB MAKE and DBB menus need not necessarily be changed. Also, the SAC routine (236) for the modified block type is changed to reflect the modification.

The microfiche appendix of source code embodies the procedure for adding a new block type or modifying an existing block type according to the invention, and is incorporated herein by reference. It may be implemented on any DOS based computer, such as an IBM PS/2 using the PC-DOS 3.3 operating system. The compiler is a Microsoft C-compiler, version 5.0, and a Microsoft Overlay Linker (version 3.61) is used along with Microsoft Library Manager version 3.08. A Microsoft Macro Assembler (version 5.0) is also used. The computer used to add/modify a block type need not be on network 14. When the adding or modifying procedure is complete, an executable file is created from the modified LDBA 26 and is copied into each SCADA node 12d-12h.

Other embodiments are within the following claims.

A portion of the disclosure of this patent document contains material which is subject to copyright protection. The copyright owner has no objection to the facsimile reproduction by anyone of the patent document or patent disclosure, as it appears in the Patent and Trademark Office file or records, but otherwise reserves all copyright rights whatsoever.

I claim:

1. A system that comprises
a processor,
a process database for storing data, said database including a plurality of types of data blocks, said types of blocks being organized so that each said type includes blocks of data on which said processor performs a common type of processing that is different from the processing performed by said processor on other types of data blocks, each one of said data blocks of each said type storing data that is specific to said block type and data that is generic to said block type and at least one other block types,
means for maintaining a table that contains a record of information identifying a category of specific routines for processing data that is specific to one of said block types, said processor using said specific routines to perform said common type of processing for said block type, and
means for maintaining a separate table that contains a record of information identifying a category of generic routines for processing data that is generic to said one block type and at least one other block type,
said processor processing data in each block of said one type by: (1) accessing said table and said separate table to obtain said specific routines and said generic routines, and (2) executing said specific routines and said generic routines on said specific data and said generic data, respectively, of said block.

2. The system of claim 1 further comprising
means for maintaining a plurality of tables corresponding respectively to said plurality of block types, each table containing a record of information that identifies the category of routines that are specific to the corresponding block type, and
said record of said separate table containing information identifying said generic category of routines for said plurality of block types.

3. The system of claim 2 further comprising means for maintaining a second separate table that includes a record of information identifying a category of routines that are generic to all of said types of data blocks.

4. The system of claim 2 or 3 wherein the record of said plurality of tables, the record of said separate table, and the record of said second separate table each comprise a set of entries that indicate parameters of each described routine.

5. The system of claim 4 wherein one of said parameters is a name of said routine.

6. The system of claim 2 or 3 wherein one of said parameters is a location in a memory of a piece of data that the described routine will process.

7. The system of claim 6 wherein one of said parameters is a size of said piece of data.

8. The system of claim 2 or 3 wherein one of said parameters is an input function for processing data that the described routine will process.

9. The system of claim 2 or 3 wherein one of said parameters is an output function for processing data that the described routine will process.

10. The system of claim 2 or 3 wherein one of said parameters is a protection level of the described routine.

11. The system of claim 2 or 3 wherein one of said parameters is a generic parameter that can be different for different described routines.

12. The system of claim 1 wherein all data blocks comprise header fields and other fields, and said generic routines process data in said header fields and said specific routines process data in said other fields.

13. The system of claim 1 further comprising a plurality of computers that communicate over a network, each one of said computers including said means for maintaining said table and said means for maintaining said separate table.

14. The system of claim 13 wherein contents of said table and said separate table are identical for at least some of said computers.

15. The system of claim 14 wherein at least one of said computers is adapted to transfer data between its process database and external devices.

16. The system of claim 15 wherein at least one of said external devices is a sensor that sends data representative of a detected condition to said process database.

17. The system of claim 15 wherein at least one of said external devices is a control device for performing an operation in response to data sent from said process database.

18. The system of claim 15 wherein at least one of the computers on said network is adapted to obtain over the network data stored in the process database of said computers that transfer data to and from said external devices.

19. The system of claim 1 wherein at least one routine in said category that is specific to one of said block types is also in said category that is specific to another one of said block types.

20. In a system that comprises a processor and a process database for storing data, said database including a plurality of types of data blocks, said types of blocks being organized so that each said type includes blocks of data on which said processor performs a common type of processing that is different from the processing performed by said processor on other types of data blocks, each one of said data blocks of each said type storing data that is specific to said block type and data that is generic to said block type and at least one other block type, a method of adding a new type of data block which will store at least said generic data, said method comprising the steps of
said processor accepting input from a user of said system that defines a category of specific routines for processing data that is specific to said new type of data block, said processor thereafter using said specific routines to perform said common type of processing for said new type of data block,
said processor responding to said input by creating a table for said new block type that contains a record of information identifying said category of specific routines for said new type of block, and
said processor maintaining information identifying a category of generic routines for processing data that is generic to said new type of block and at least one other block type in a record of a separate, pre-existing table so that said processor need not redescribe said generic routines in said table that said processor creates for said new block type.

21. In a system that comprises a processor and a process database for storing data, said database including a plurality of types of data blocks, said types of blocks being organized so that each said type includes blocks of data on which said processor performs a common type of processing that is different from the processing performed by said processor on other types of data blocks, each one of said data blocks of each said type storing data that is specific to said block type and data that is generic to said block type and at least one other block type, a method of modifying an existing type of data block, said method comprising the steps of     said processor maintaining a table that contains a record of information identifying a category of specific routines for processing data that is specific to said type of data block being modified, said processor using said specific routines to perform said common type of processing for said type of data block,     said processor accepting input from a user of said system that modifies one or more of said specific routines of said type of data block,     said processor responding to said input by modifying said table so that said record of information identifies the modified routines, and     said processor maintaining information identifying a category of generic routines for processing data that is generic to said type of block being modified and at least one other block type in a record of a separate table so that said user need not enter said information identifying said generic routines to enable said processor to perform said modifying of said table for said modified block type.

22. The method of claim 21 wherein said modifying comprises said processor accepting input from said user that changes an existing routine in said category of specific routines, and     said processor changing the record that contains information about said changed routine in said table for said block type, without changing a record in said separate table for said generic routines.

23. The method of claim 21 wherein said modifying comprises said processor accepting input from said user that adds a new routine to said category of specific routines, and     said processor changing said table for said block type to include a record of information about said new routine, without changing a record in said separate table for said generic routines.

24. The method of claim 20 or 21 wherein the system further comprises means for maintaining a plurality of tables respectively corresponding to the plurality of types of data blocks, each one of said tables having a record of information about a category of routines that are specific to the corresponding block type, the record of said separate table containing information about said generic category of routines for said plurality of block types.

25. The method of claim 24 wherein the record of said plurality of tables and the record of said generic table each contain an identical set of entries for information concerning routines.

* * * * *